(12) United States Patent
Ohana et al.

(10) Patent No.: US 8,553,547 B2
(45) Date of Patent: *Oct. 8, 2013

(54) SYSTEMS AND METHODS FOR RETRANSMITTING PACKETS OVER A NETWORK OF COMMUNICATION CHANNELS

(75) Inventors: Yitshak Ohana, Givat Zeev (IL); Philippe Klein, Jerusalem (IL); Avi Kliger, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/729,320

(22) Filed: Mar. 23, 2010

(65) Prior Publication Data

US 2010/0246586 A1    Sep. 30, 2010

Related U.S. Application Data

(60) Provisional application No. 61/164,507, filed on Mar. 30, 2009.

(51) Int. Cl.
*H04L 12/26* (2006.01)
*H04L 12/54* (2013.01)
*H04B 7/212* (2006.01)
*H04N 7/173* (2011.01)

(52) U.S. Cl.
USPC ........... 370/235; 370/394; 370/428; 370/442; 725/118; 725/145; 725/148

(58) Field of Classification Search
USPC ......... 370/400, 235, 394, 428, 442; 725/118, 725/145, 148
See application file for complete search history.

(56) References Cited

U.S. PATENT DOCUMENTS 3,836,888 A  9/1974  Boenke et al.
4,413,229 A  11/1983  Grant
(Continued)

FOREIGN PATENT DOCUMENTS

CN  1422043  6/2003
CN  1588827  8/2004
(Continued)

OTHER PUBLICATIONS

Ovadia S., "MoCA: Ubiquitous Multimedia Networking in the Home," Proceedings of the SPIE—The International Society for Optical Engineering SPIE—The Internaitional Society for Optical Engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG006776000000167760C00000&idtype=cvips&prog=normal>.

(Continued)

*Primary Examiner* — Alpus H Hsu
(74) *Attorney, Agent, or Firm* — McDermott Will & Emery LLP

(57) ABSTRACT

Systems and methods for transmitting packets over a network of communication channels are provide. A system according to the invention may include first and second nodes in communication with a coax backbone. The first node may further include a retransmission buffer. The system may also include a network access coordinator operative to coordinate access of the nodes to the coax backbone. In a time period at least one first packet is transmitted by the first node to the second node. The first packet may include an indication that retransmission service is applied. The first packet may also include a indication of the length corresponding to the packet. If, during the first time period the packet is not received by the second node, the second node is operative to send a retransmission request to the network access coordinator.

28 Claims, 7 Drawing Sheets

(56) References Cited

U.S. PATENT DOCUMENTS

| | | |
|---|---|---|
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,817,642 B2 | 10/2010 | Ma et al. |
| 7,822,060 B2* | 10/2010 | Sterenson et al. ............ 370/445 |
| 7,860,092 B2 | 12/2010 | Yoon et al. |
| 7,916,756 B2 | 3/2011 | Atsumi et al. |
| 8,040,908 B2* | 10/2011 | Choi et al. .................... 370/414 |
| 8,184,550 B2 | 5/2012 | Beck et al. |
| 8,266,265 B2* | 9/2012 | Liu et al. ....................... 709/223 |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1* | 5/2005 | Wronski et al. ............... 709/223 |
| 2005/0152350 A1* | 7/2005 | Sung et al. .................... 370/376 |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1* | 3/2006 | Clark et al. .................... 714/752 |
| 2006/0062250 A1 | 3/2006 | Payne, III |
| 2006/0068708 A1 | 3/2006 | Dessert et al. |
| 2006/0078001 A1 | 4/2006 | Chandra et al. |
| 2006/0104201 A1* | 5/2006 | Sundberg et al. ............. 370/230 |
| 2006/0256799 A1 | 11/2006 | Eng |
| 2006/0256818 A1 | 11/2006 | Shvodian et al. |

| | | | |
|---|---|---|---|
| 2006/0268934 A1 | 11/2006 | Shimizu et al. | |
| 2006/0280194 A1 | 12/2006 | Jang et al. | |
| 2007/0025317 A1 | 2/2007 | Bolinth et al. | |
| 2007/0040947 A1 | 2/2007 | Koga | |
| 2007/0064720 A1* | 3/2007 | Sterenson et al. | 370/445 |
| 2007/0127373 A1 | 6/2007 | Ho et al. | |
| 2007/0160213 A1 | 7/2007 | Un et al. | |
| 2007/0171919 A1 | 7/2007 | Godman et al. | |
| 2007/0183786 A1 | 8/2007 | Hinosugi et al. | |
| 2007/0206551 A1 | 9/2007 | Moorti et al. | |
| 2007/0217436 A1 | 9/2007 | Markley et al. | |
| 2007/0253379 A1 | 11/2007 | Kumar et al. | |
| 2007/0286121 A1* | 12/2007 | Kolakowski et al. | 370/329 |
| 2008/0037487 A1 | 2/2008 | Li et al. | |
| 2008/0037589 A1* | 2/2008 | Kliger et al. | 370/485 |
| 2008/0080369 A1* | 4/2008 | Sumioka et al. | 370/229 |
| 2008/0089268 A1* | 4/2008 | Kinder et al. | 370/315 |
| 2008/0117919 A1 | 5/2008 | Kliger | |
| 2008/0117929 A1 | 5/2008 | Kliger | |
| 2008/0130779 A1 | 6/2008 | Levi | |
| 2008/0178229 A1 | 7/2008 | Kliger | |
| 2008/0189431 A1 | 8/2008 | Hyslop et al. | |
| 2008/0212591 A1 | 9/2008 | Wu et al. | |
| 2008/0225832 A1 | 9/2008 | Kaplan et al. | |
| 2008/0238016 A1 | 10/2008 | Chen et al. | |
| 2008/0259957 A1 | 10/2008 | Kliger | |
| 2008/0271094 A1 | 10/2008 | Kliger | |
| 2008/0273591 A1 | 11/2008 | Brooks et al. | |
| 2008/0279219 A1 | 11/2008 | Wu et al. | |
| 2008/0298241 A1 | 12/2008 | Ohana | |
| 2009/0010263 A1* | 1/2009 | Ma et al. | 370/395.4 |
| 2009/0063878 A1 | 3/2009 | Schmidt et al. | |
| 2009/0092154 A1 | 4/2009 | Malik et al. | |
| 2009/0106801 A1 | 4/2009 | Horii | |
| 2009/0122901 A1* | 5/2009 | Choi et al. | 375/267 |
| 2009/0165070 A1 | 6/2009 | McMullin et al. | |
| 2009/0217325 A1 | 8/2009 | Kliger | |
| 2009/0252172 A1 | 10/2009 | Hare | |
| 2009/0254794 A1 | 10/2009 | Malik et al. | |
| 2009/0257483 A1 | 10/2009 | French et al. | |
| 2009/0279643 A1 | 11/2009 | Shusterman | |
| 2009/0285212 A1 | 11/2009 | Chu et al. | |
| 2009/0296578 A1 | 12/2009 | Bernard et al. | |
| 2009/0316589 A1 | 12/2009 | Shafeeu | |
| 2010/0031297 A1 | 2/2010 | Klein et al. | |
| 2010/0074263 A1* | 3/2010 | Bry et al. | 370/401 |
| 2010/0080312 A1 | 4/2010 | Moffatt et al. | |
| 2010/0142378 A1* | 6/2010 | Matheney et al. | 370/241 |
| 2010/0142540 A1* | 6/2010 | Matheney et al. | 370/400 |
| 2010/0146616 A1* | 6/2010 | Garrett et al. | 726/11 |
| 2010/0150016 A1 | 6/2010 | Barr | |
| 2010/0158013 A1 | 6/2010 | Kliger | |
| 2010/0158015 A1* | 6/2010 | Wu | 370/395.7 |
| 2010/0158021 A1 | 6/2010 | Kliger | |
| 2010/0158022 A1 | 6/2010 | Kliger | |
| 2010/0162329 A1 | 6/2010 | Ford et al. | |
| 2010/0174824 A1* | 7/2010 | Aloni et al. | 709/230 |
| 2010/0180171 A1* | 7/2010 | Liu et al. | 714/748 |
| 2010/0185731 A1* | 7/2010 | Wu | 709/204 |
| 2010/0185759 A1 | 7/2010 | Wu | |
| 2010/0214916 A1* | 8/2010 | Wu et al. | 370/230 |
| 2010/0238932 A1 | 9/2010 | Kliger | |
| 2010/0254278 A1 | 10/2010 | Kliger | |
| 2010/0254402 A1 | 10/2010 | Kliger | |
| 2010/0281195 A1* | 11/2010 | Daniel et al. | 710/105 |
| 2010/0284474 A1 | 11/2010 | Kliger | |
| 2010/0290461 A1 | 11/2010 | Kliger | |
| 2010/0322134 A1 | 12/2010 | Wu | |
| 2011/0001833 A1 | 1/2011 | Grinkemeyer et al. | |
| 2011/0013633 A1 | 1/2011 | Klein et al. | |
| 2011/0080850 A1 | 4/2011 | Klein et al. | |
| 2011/0205891 A1 | 8/2011 | Kliger et al. | |
| 2011/0310907 A1 | 12/2011 | Klein et al. | |

FOREIGN PATENT DOCUMENTS

| | | |
|---|---|---|
| EP | 0 385695 | 9/1990 |
| EP | 0 622926 | 11/1994 |
| EP | 1501326 | 6/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27253 dated Dec. 30, 2003 (4 pgs.).

International Search Report for International Application No. PCT/US03/27254 dated Feb. 3, 2004 (5 pgs.).

Multichannel News, MoCA Brewing Up Bigger Bandwidth, Dec. 15, 2008 Interview with CTO Anton Monk http://www.multichannel.com/article/160878-MaCa_Brewing_Up_bigger_Bandwidth.php downloaded on Mar. 29, 2009.

Ovadia S., "MoCA: Ubiquitous Multimedia Networking in the Home," Proceedings of the SPIE—The International Society for Optical Engineering SPIE—The Internaitonal Society for Optical Engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG006776000000167760C00000&idtype=cvips&prog=normal>.

European Search Report for Application No. EP 10 00 3164 mailed Jun. 22, 2010.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

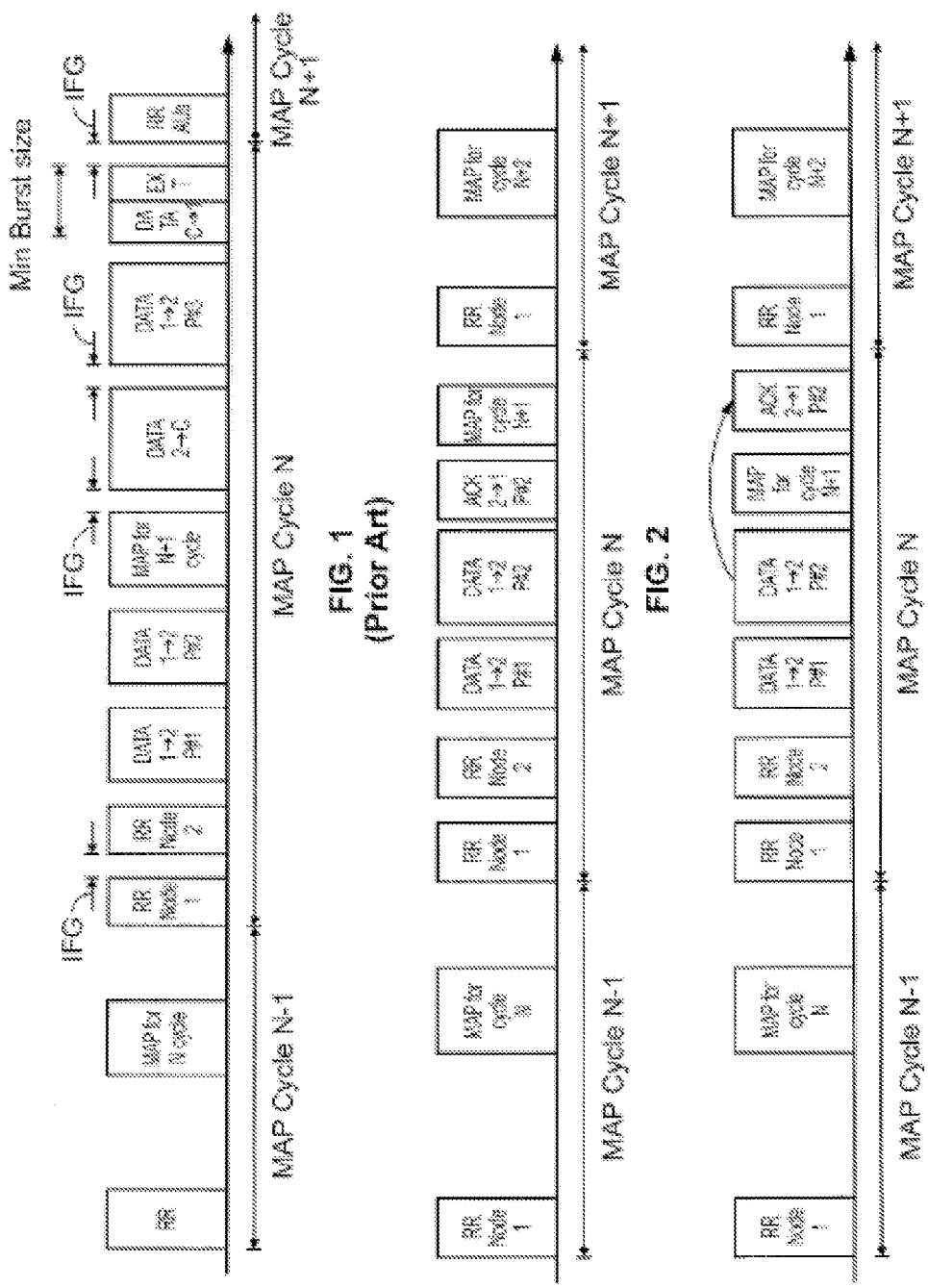

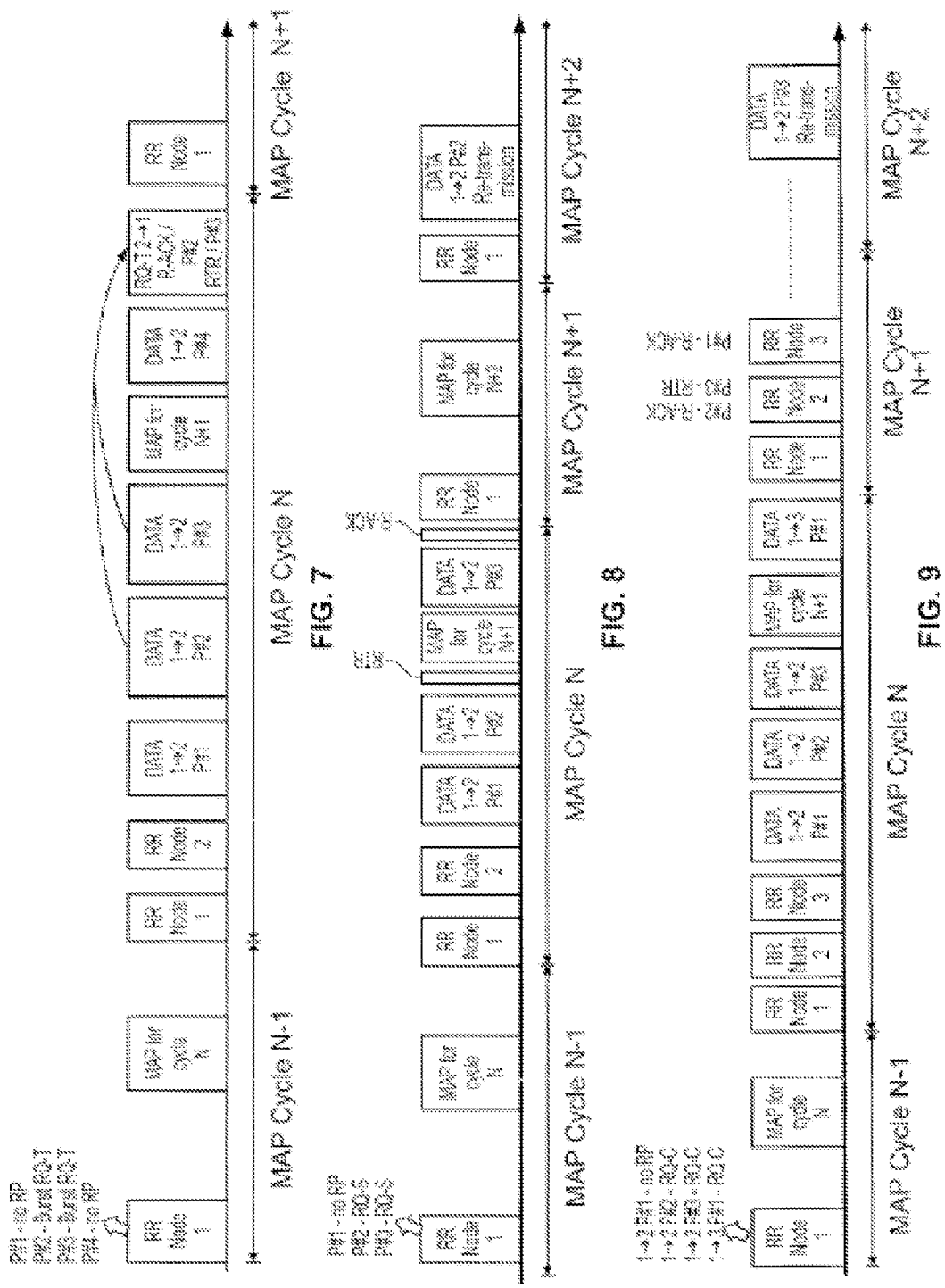

SYSTEMS AND METHODS FOR RETRANSMITTING PACKETS OVER A NETWORK OF COMMUNICATION CHANNELS

CROSS-REFERENCE TO RELATED APPLICATION

This application claims priority to U.S. Provisional Application No. 61/164,507, filed Mar. 30, 2009, entitled, "System and Method For Retransmitting Packets Over a Network of Communication Channels," which is hereby incorporated by reference herein in its entirety.

CROSS-REFERENCE TO RELATED APPLICATION

The present invention relates generally to information networks and specifically to transmitting information such as media information over communication lines such as coaxial cable (hereinafter "coax"), thereby to form a communications network.

BACKGROUND OF THE INVENTION

Home networking over coax is a known technology which has vast commercial potential.

Home network technologies having a packet aggregation functionality are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. Packet aggregation functionality is not provided. MoCA 1.0 specification is incorporated by reference herein in its entirety.

Home networking over coax taps into the vast amounts of unused bandwidth available on the in-home coax. More than 70% of homes in the United States have coax already installed into the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home without affecting the existing analog or digital services present on the cable. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHZ for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

The coax infrastructure inside the house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single "isolation jump" and a number of "insertion jumps". Typically isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network unlike some other home networking technologies. It is specifically designed to support streaming video without packet loss providing very high video quality between outlets.

Digital cable programming is delivered with threshold Packet Error Rate (PER) of below 1e-6. The home network should preferably have similar or better performance so as not to degrade viewing.

The disclosures of any publications and patent documents mentioned in the specification, and of the publications and patent documents cited therein directly or indirectly, are hereby incorporated by reference.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 1 is a prior art timing diagram;

FIG. 2 is an illustrative timing diagram in accordance with the principles of the invention;

FIG. 3 is another illustrative timing diagram in accordance with the principles of the invention;

FIG. 7 is an illustrative timing diagram in accordance with the principles of the invention;

FIG. 8 is another illustrative timing diagram in accordance with the principles of the invention; and FIG. 9 is an illustrative timing diagram in accordance with the principles of the invention.

DETAILED DESCRIPTION OF PREFERRED EMBODIMENTS

Figure 4:
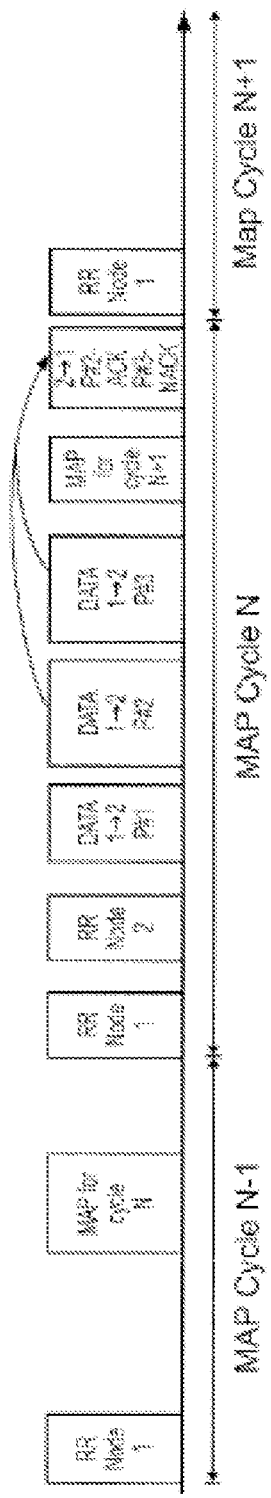
FIG. 4 is yet another illustrative timing diagram in accordance with the principles of the invention.

The present invention provides improved systems and methods for streaming media over coax.

Some embodiments of the invention may include a system for transmitting packets over a network of communication channels. The system may include a set of nodes comprising at least first and second nodes and a network access coordinator operative to coordinate the access of the set of nodes to a synchronous network of channels, wherein, if at least one individual packet has been transmitted from the first node to the second node which did not receive at least one packet, the second node is operative to send a retransmission request to the network access coordinator requesting retransmission of at least one individual packet.

The network may have a Coordinated MAC to allow contention free access. The coordinated MAC may be a home network coordinated MAC such as, for example, that described in the MoCA MAC/PHY SPECIFICATION v. 1.0 ("the MoCA Specification"), Feb. 22, 2006, which is hereby incorporated herein in its entirety. The MoCA Specification identifies features of a home network over existing coaxial cable. The method may allow the expansion of the coordinated network MAC to other media in the home like power lines and phone lines (or wireless) to improve the accessibility of the network to rooms in the home that are not accessible via coaxial cables.

The retransmission request for an individual packet which failed to transmit in MAP cycle N may occur in MAP cycle N+1.

The network access coordinator may be operative to receive and to accede to the retransmission request.

The retransmission of an individual packet which failed to transmit in MAP cycle N may occur in MAP cycle N+2.

Some embodiments of the invention may include a system for transmitting packets over a network of communication channels. The system may include a set of nodes interconnected by a synchronous network of channels and a network access coordinator operative to coordinate the access of the set of nodes to the synchronous network of channels including providing a plurality of slots in each MAP cycle for packet transmission requests sent to the coordinator by individual nodes in the set of nodes, and wherein at least one individual node in the set of nodes is operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

In some embodiments, the network access coordinator may be operative to provide a plurality of slots in each MAP cycle for packet transmission requests sent to the coordinator by individual nodes in the set of nodes. At least one individual node in the set of nodes may be operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

In some embodiments, if a plurality of packets have been transmitted from the first node to the second node which did not receive at least some of the plurality of packets, the second node may be operative to send a single burst to the network access coordinator. The burst may include retransmission requests requesting retransmission of those packets from among the plurality of packets which were not received.

In some embodiments, a retransmission request sent by the second node in a MAP cycle N may requests retransmission of only those packets which were not received by the second node in a previous MAP cycle N−1.

In some embodiments, overhead information which is common to the reservation request and the re-transmission request may be transmitted by the individual node to the coordinator only once.

In some embodiments, if the first node sent the second node, in a MAP cycle N−1, an aggregation frame including a plurality of packets only some of which were received by the second node, in MAP cycle N, the second node may refrain from requesting retransmission of those packets, from among those sent in MAP cycle N−1, which were successfully received and successfully de-aggregated by the second node.

In some embodiments, at least one retransmission request may include an indication of a slot duration to be used to retransmit the individual packet.

In some embodiments, if the first node sent the second node, in a MAP cycle N−1, an aggregation frame including a plurality of packets only some of which were received by the second node, the retransmission request sent by the second node to the network access coordinator may request retransmission of less than all of the plurality of packets and may include an indication, computed by the second node, of a slot duration to be used to retransmit the packets for which retransmission is requested.

In some embodiments, a retransmission request sent by the individual node in a MAP cycle N requests retransmission of only those packets which were not received by the individual node in a previous MAP cycle N−1.

In some embodiments, if in a MAP cycle N−1, the second additional node sent the individual node an aggregation frame including a plurality of packets, only some of which were received by the individual node, in MAP cycle N, the individual node may refrain from requesting retransmission of those packets, from among those sent in MAP cycle N−1, which were successfully received and successfully de-aggregated by the individual node.

In some embodiments, if in a MAP cycle N−1, the second additional node sent the individual node an aggregation frame including a plurality of packets only some of which were received by the individual node, the retransmission request sent by the individual node to the network access coordinator may request retransmission of less than all of the plurality of packets and may include an indication, computed by the individual node, of a slot duration to be used to retransmit the packets for which retransmission is requested.

Some embodiments of the invention may include a method for transmitting packets over a network of communication channels. The method may include coordinating the access of a set of nodes to a synchronous network of channels interconnecting the set of nodes. The coordinating may include providing a plurality of slots in each MAP cycle for packet transmission requests sent to a coordinator by individual nodes in the set of nodes. In some embodiments, at least one individual node in the set of nodes may be operative to utilize an individual slot from among the plurality of slots to transmit to the coordinator both a reservation request and a retransmission request, the reservation request including a request to transmit a first packet to a first additional node and the retransmission request including a request that a second additional node retransmit a second packet previously unsuccessfully transmitted from the second additional node to the individual node.

Some embodiments may include a method for transmitting packets over a network of communication channels. The method may include coordinating the access of a set of nodes, which may include at least first and second nodes, to a synchronous network of channels interconnecting the set of nodes. In some embodiments, if at least one individual packet has been transmitted from the first node to the second node which did not receive at least one packet, the second node may be operative to send a retransmission request to a network access coordinator requesting retransmission of at least one individual packet.

Typically, as a result of the de-aggregation process, the Rx node knows the size of a frame since size information is included in the frame's header. The Rx node may know some or all of the sizes of the individual packets in the frame either because this information was included in packet headers, and the packet headers were received even if their associated packets were not, or because the information regarding sizes of packets was included in the frame header. If a particular packet size is not known, the Rx node typically requests that all packets from that packet onward be re-transmitted. If all packet sizes are known, the Rx typically requests re-transmission only of missing packets and easily indicates a suitable slot duration as the sum of the known sizes of all missing packets.

Positive or Negative Acknowledgements for properly received packets are typically effected via the Reservation Request messages from the receiving node to the network coordinator.

An acknowledgment message ("ACK") is typically a single message referring to a burst of received packets. In the context of packet aggregation distinct negative acknowledgment messages ("NACKs") typically correspond to individual packets in the aggregated received burst.

The network coordinator may include an Automatic Retransmission reQuest ("ARQ") mechanism. If so, it may be used as a proxy to convey one or more ACK messages to the transmitting node and to retransmit one or more improperly received packets. The ARQ mechanism typically does not require additional bandwidth, in contrast to conventional retransmission mechanisms.

Some embodiments of the invention may include a method for retransmitting a packet before initial transmission of a next-queued packet. Packet order is thus retained by not transmitting the next-queued packet before receiving an acknowledgement of the already-transmitted packet.

Table 1 lists abbreviations that are used in the description and FIGS. herein.

TABLE 1

| Acronym | Term |
| --- | --- |
| RP | Retransmission Protocol |
| R-ACK | Receipt Acknowledgement |
| RTR | Retransmission Request |
| RQ-T | Retransmission Request Transmitter |
| RQ-S | Retransmission Request Signal |
| RQ-C | Retransmission Request Coordinator |
| ARQ | Automatic Retransmission request |
| MAP | Medium Access Plan |
| ACK | Acknowledgment Message |
| NACK | Negative Acknowledgment Message |
| RR | Retransmission Request |
| P#Z | Packet No. Z |
| X → Y | Information being transmitted from Node X to Node Y |

FIG. 1 shows a timing diagram corresponding to one example of a MAC access method for an illustrative coordinated network. A network coordinator controls access to network media by allocating transmission opportunities to all network terminals. The coordinator thereby reduces or eliminates the likelihood that there will be contention in the network. The coordinator may assign priorities to the transmission of information based on information source, content, affect on QoS or any other suitable criterion. Some coordinated networks have collision-free periods as well as collision periods. Others, such as those governed by the MoCA Specification, have only collision free periods.

One prior art MAC Access Method is described in the MoCA MAC/PHY SPECIFICATION v1.0, Feb. 22, 2006. FIG. 1 shows the MoCA MAC schema for coordination of network access by a network coordinator. The access time is divided into MAP cycles which are managed by the network coordinator. Access rules for a MAP cycle may be defined in a MAP message sent in a previous MAP cycle by the network coordinator to all nodes.

The FIG. 1 example includes three network nodes: coordinator, node 1 and node 2. The coordinator sends transmission opportunities for MAP cycle N in the MAP message of the MAP cycle N−1. Illustrative opportunities and some corresponding illustrative precedents that may be associated with the timing diagram of FIG. 1 are summarized in Table 2.

TABLE 2

| Opportunity number | Opportunity | Precedent |
| --- | --- | --- |
| 1 | Reservation request ("RR") for node #1 | |
| 2 | RR for node #2 | |
| 3 | First data packet transmitted by node #1 to node #2 | Based on a MAP cycle N − 1 node #1 request granted in the MAP message of that cycle by the coordinator. |
| 4 | Second packet transmitted by node #1 to node #2 | |
| 5 | MAP message for cycle N + 1 (sent by coordinator) | Based on RR received Opportunities Nos. 1 and 2. |
| 6 | Data transmitted from node #2 to coordinator | |
| 7 | Third data packet transmitted by node #1 to node #2 | |

TABLE 2-continued

| Opportunity number | Opportunity | Precedent |
| --- | --- | --- |
| 8 | Data transmitted from coordinator to node #1 | |
| 9 | Extension packet | May be included if the data in opportunity 9 is less than a minimum burst size. |

Typically, there is an Inter Frame Gap (IFG) between any two bursts transmitted, and there is a minimum burst size. If data size is smaller than the Min Burst Size an extension packet size may be allocated as shown in FIG. 1.

The IFG as well as the Min Burst Size typically cause additional overhead and reduce the effective data rate of the network, however, they contribute toward reliable operation of the modem.

Retransmission is useful for increasing the robustness of data transfers, because a packet that was received with an error can be retransmitted. In particular, retransmissions are common in media that are susceptible to impulse noises. Impulse noises are created by home appliances as well as other noise sources and are received on wired media such as phone lines and power lines. Other media, such as Ethernet CAT5 wires and coaxial wires, are much less susceptible to impulse noises due to their better isolation from external noises. An impulse noise can be high enough in amplitude and long enough in time to cause packet errors or even packet loss.

If a coordinated network is to operate over noisy media (such as telephone lines or power lines) a Retransmission Protocol ("RP") is typically employed to provide appropriate network performance. The coordinated network shown in FIG. 1 is designed to operate over "quiet" media. An example of a network designed to provide a robust and reliable home networking over coaxial cables is that described in the MoCA Specification. Embodiments of the invention may include providing an RP in connection with a coordinated network protocol, such as that set forth in the MoCA Specification. The methods described herein may be used efficiently in conjunction with the MoCA Specification in other suitable media, such as power lines and phone lines.

In some embodiments of the invention, the network coordinator may select from several retransmission protocols. One protocol may be set as a default method that is implemented by all nodes. A general algorithm for an RP is as follows:
1. The transmitting node transmits a packet or several packets and waits for an acknowledgement;
2. A. If the receiving node receives the packet correctly, the receiving node sends a Receive Acknowledgement (R-ACK).
   B. If the receiving node does not receive the packet correctly, the receiving node sends a Retransmission Request (RTR).
3. The transmitting node, upon receiving an R-ACK or RTR, retransmits the packet.
4. The transmitting node retransmits the package if neither an R-ACK nor RTR were sent.

The maximum number of retransmissions is typically a parameter of a data stream. The stream may include video data. The stream may include voice data. The stream may include browsing data. The stream may include any suitable type of data. After the transmitting node has sent the maximum number of retransmissions, no further attempts to transmit the packet are made. The receiving node typically forwards the received packets in the order of transmission by the transmitting node. If a packet is missing, the receiver node typically does not forward the next packet until the missing packet is received unless the maximum number of retransmissions has been reached.

Five illustrative ARQ protocol-based methods, and three more general retransmission methods based thereupon, are now described. In some embodiments of the invention, nodes may select an ARQ protocol during the establishment of a connection. One of the options is typically set as a default method that is implemented by all nodes. For example, Method #1 can be the default method. In general, ARQ protocols follow an algorithm such as:
1. The transmitting node sends a reservation request ("RR") corresponding to an expected transmission of a packet. If ARQ is employed, the node so signifies in the RR.
2. The transmitting node transmits the packet and waits for an ACK.
3. The receiving node receives the packet and checks if it has been received correctly.
4. If the packet has been received correctly the receiving network sends an ACK.
5. If the packet has been received incorrectly, or not at all, the receiving node either sends a NACK or does not reply.
6. Upon receiving an ACK or a NACK, the transmitting node decides whether to retransmit the packet or not. If neither ACK nor NACK were received the transmitted node may retransmit the packet.
7. The number of retransmissions is a parameter of the connection.

FIG. 2 shows illustrative method 1 (Immediate ARQ), which may include some or all of the following steps in a suitable order:
1. The transmitting (TX) node in its reservation request (RR) requests to transmit a packet to the receiving node indicating that transmission is under ARQ.
2. The coordinator allocates two time slots for the transmission of this packet. The first slot is for transmission of the packet by the TX node. The second slot is for transmission of the ACK/NACK message by the receiving (RX) node immediately following the TX. In some embodiments, the coordinator allocates slots that are equal to a minimum burst size.
3. The TX node sends the packet after the TX node receives a grant message indicating that coordinator granted a RR for the packet.
4. The RX node sends the ACK/NACK in the second slot.
5. The TX analyzes the ACK/NACK message and, if NACK is received, in the next RR opportunity the TX node request for retransmission the packet.
6. The coordinator receives the RR and grants the request if the maximum number of retransmission requests has not yet been reached.
7. If granted, the TX node retransmits the packet in the next MAP cycle.
8. This procedure can repeat itself several times according to the parameters of the ARQ of this connection.

FIG. 3 shows illustrative method 2 (Single Frame ARQ), which may be similar to method 1 (shown in FIG. 2), except that the allocation for the ACK/NACK message does not necessarily immediately follow the TX node transmission.

FIG. 4 shows illustrative method 3 (Multiple Frame ARQ), which may be similar to method 2, except that one ACK/NACK is sent to acknowledge in aggregate more than one received packet. For example, FIG. 4 shows an ACK for packet 2 and a NACK for packet 3.

Figure 5:
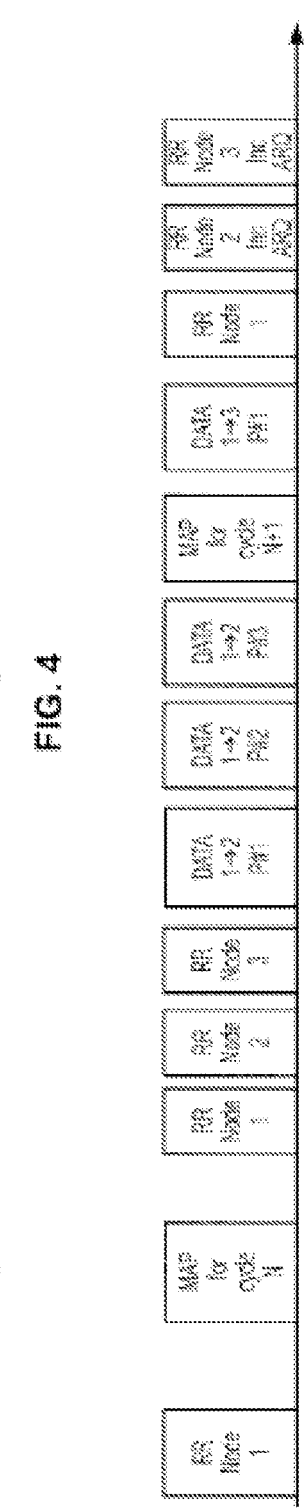
FIG. 5 is still another illustrative timing diagram in accordance with the principles of the invention.

FIG. 5 shows illustrative method 4 (ACK/NACK Embedded in RR—included in ARQ messages) enables more efficient ARQ throughput. The ACK/NACK message is not transmitted on its own and instead is embedded in the RR message of the RX node in MAP cycle N+1. When RR messages are shorter than the Min Burst Size time, additional overhead for the ACK/NACK may be conserved (although higher latency may be involved).

Figure 6:
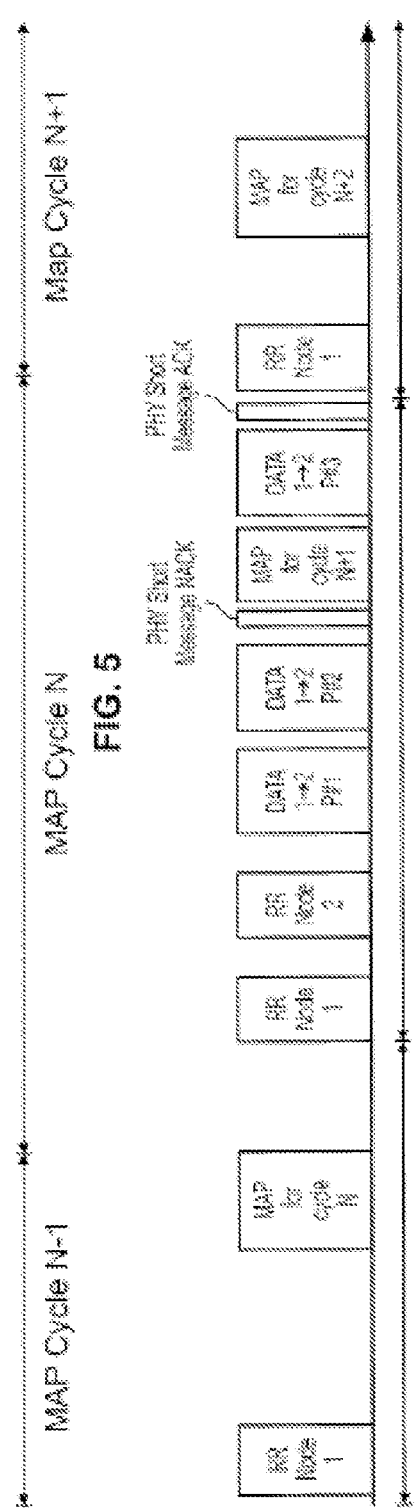
FIG. 6 is another illustrative timing diagram in accordance with the principles of the invention.

FIG. 6 shows illustrative method 5 (Very short Immediate ACK/NACK), which may be similar to Method 1, except that the ACK/NACK is a very short message, such as a 64 bit BPSK series that is detected by the PHY. This is efficient with respect to throughput, but may require changes to the PHY and fast response to detection of error (or no error) by transmission of the short ACK/NACK.

FIG. 7 shows illustrative method 6 (Retransmission Request Transmitter (RQ-T)), which may be operative to send a single or burst R-ACK/RTR message to the transmitter. In some embodiments of the invention, the method may include some or all of the following steps in a suitable order such as the following:

1. The transmitting (TX) node in its reservation request (RR) requests to transmit one or multiple frames to the receiving node.
2. The transmitting node indicates in the RR the following information:
   A. An indication that the frame is in Retransmission Protocol;
   B. An indication that the method of RP is preferred over RQ-T; and
   C. Single or burst RQ-T.
3. The coordinator allocates slots for the transmission and RP of the frames typically in one of the following orders:
   A. If single RQ-T is used, a slot is allocated for transmission of the first frame by the TX node, a slot is then allocated for transmission of the single RQ-T message by the RX node, and finally, slots are allocated for the rest of the frames deemed "required" by the TX node.
   B. If a burst of RQ-T is used, slots are allocated for transmission of all frames deemed "required" by the TX node, and one slot is then allocated for transmission of the burst RQ-T message by the RX node.
   3. In some embodiments, the coordinator may be operative to allocate one or more slots for an RQ-T message immediately after a packet or packets that required RQ-T or in a corresponding or subsequent MAP.
4. The coordinator indicates to the RX node which frames are to be acknowledged in each RQ-T message.
5. The TX node sends the frames according to the grant received from the coordinator.
6. The RX node sends an RQ-T message in the RQ-T slots granted by the coordinator.
7. The RQ-T message is sent, with an indication of R-ACK or RTR, for frames that requested acknowledgment in that specific RQ-T message.
8. The TX node analyzes the RQ-T message and may, if application-appropriate, add an RR element in the next RR transmission for retransmission of the frames missed by the RX node.
9. The coordinator receives the RR and may grant the slot according to the above steps.
10. The foregoing actions may be repeated several times, provided that the maximum number of retransmissions is not exceeded.

FIG. 8 shows illustrative method 7 (Retransmission Request Signal (RQ-S)), which may be operative to send single R-ACK/RTR signal to the transmitter. In some embodiments, the RQ-S may include a short signal with an indication of R-ACK or RTR which may be allocated immediately following each burst requiring retransmission under the RQ-S method. Method 7 typically comprises some or all of the following steps in a suitable order such as the following:

1. The transmitting (TX) node in its reservation request (RR) requests to transmit one or multiple of frames to the receiving node.
2. The transmitting node indicates in the RR the following information:
   A. An indication that the frame is in Retransmission Protocol; and
   B. An indication that the RP method is preferred over the RQ-S method.
3. The coordinator allocates, for each burst with RQ-S, the slot for transmission of the frame by the TX node and the slot for transmission of the RQ-S signal by the RX node.
4. The coordinator and the RX node check whether the RQ-S signal bears an indication of R-ACK or RTR.
5. If the RQ-S indicates R-ACK, the TX node clears the packet.
6. If the RQ-S indicates RTR, the coordinator allocates a slot for retransmission of the frame by the TX node.
7. If the coordinator has not received the RQ-S and the TX node receives it with R-ACK, the coordinator allocates a slot for retransmission and the TX node sends an empty frame.
8. If the TX node has not received the RQ-S and the coordinator receives it with an R-ACK indication, the coordinator indicates that the frame was received correctly in the next allocation slot of the flow.
9. The R-ACK or RTR indication is on the whole frame with no indication per packet if the frame is aggregate.

A short RQ-S signal is easy to distinguish from other network signals. A short RQ-S may use a commonly known (MoCA, e.g.) PHY preamble used by the network with different parameters. For example, an RQ-S with R-ACK indication may comprise 8 S signals followed by 4 L2 series followed by an inverted 4 L2 series followed by an S quiet period and two L1 sequences. An RQ-S with RTR indication may comprise 8 S signals followed by 4 L2 series followed by inverted 4 L2 series followed by an S quiet period and two L4 sequences, such as that shown below.

$$S = \left\{ \begin{array}{l} 0, 1, 1, 1, 0, 0, 0, 0, 1, 0, 0, 0, 0, 1, 1, \\ 1, 1, 1, 0, 0, 0, 1, 0, 0, 1, 1, 1, 1, 1, 0 \end{array} \right\}$$

$$L4 = \left\{ \begin{array}{l} 1, 0, 0, 1, 0, 1, 1, 1, 0, 1, 1, 1, 1, 0, 1, 0, \\ 0, 1, 1, 0, 1, 0, 1, 0, 1, 1, 0, 1, 1, 0, 0, 0, \\ 0, 1, 1, 1, 1, 1, 0, 0, 1, 0, 0, 0, 1, 1, 0, 0, \\ 1, 1, 1, 0, 0, 0, 1, 0, 1, 0, 0, 0, 0, 0, 0, 1 \end{array} \right\}$$

$$L2 = \left\{ \begin{array}{l} 1, 0, 1, 1, 1, 0, 0, 1, 1, 1, 1, 0, 1, 1, 1, 1, \\ 1, 0, 0, 0, 0, 0, 0, 1, 0, 1, 0, 1, 0, 0, 1, 1, \\ 0, 0, 1, 0, 0, 0, 1, 0, 0, 1, 0, 1, 1, 0, 1, 1, \\ 0, 0, 0, 1, 1, 1, 0, 1, 0, 0, 0, 0, 1, 1, 0, 1 \end{array} \right\}$$

$$L1 = \left\{ \begin{array}{l} 0, 0, 0, 0, 0, 0, 1, 0, 1, 0, 1, 0, 0, 0, 1, 1, 0, \\ 0, 1, 0, 0, 0, 1, 0, 0, 1, 0, 1, 1, 0, 0, 1, 1, 0, \\ 0, 0, 1, 1, 1, 0, 1, 0, 0, 0, 0, 1, 1, 0, 1, 0, \\ 1, 1, 1, 0, 0, 1, 1, 1, 1, 0, 1, 1, 1, 1, 1, 0 \end{array} \right\}$$

FIG. 9 shows illustrative method 8 (Retransmission Request Coordinator (RQ-C)), which may be operative to send burst R-ACK or RTR to the network coordinator. In some embodiments, the acknowledgement indication is typically sent to the coordinator in the Reservation Request Message. The method typically comprises some or all of the following steps in a suitable order such as the following:

1. The transmitting (TX) node in its reservation request (RR) requests to transmit one or multiple frames to the receiving node.
2. The transmitting node indicates in the RR the following information:
    A. That the frame is in Retransmission Protocol; and
    B. That the method of RP is preferred over RQ-C.
3. The coordinator allocates slots for transmission of the frames by the TX node.
4. In the next MAP cycle the coordinator allocates an RR slot for the RX node (even if the RX node does not need an RR slot for its TX frames).
5. The RX node checks which frames were received correctly and which were not, from all TX nodes sent to it in the previous MAP cycle.
6. The RX node sends, in the RR message, an R-ACK or RTR indication for all frames which employ RQ-C.
7. The RTR is typically sent with some or all of the following information:
    A. The sequence of frames for retransmission;
    B. If the frame was an aggregation frame and a portion of its packets was received incorrectly, send the packet sequence of the missed packets;
    C. The durations used for retransmission of these frames. If the whole frame is to be retransmitted, the duration may be taken from the RX data slot, whereas if only a portion of the frame is to be retransmitted, the duration may be computed according to the PHY profile of the TX and RX nodes.
8. In the next MAP cycle, the coordinator allocates slots to be used by the RX node for retransmission of the frames by the TX node.
9. If the R-ACK for some frames is sent in the RR message, the coordinator indicates in the next MAP that these frames were received correctly.
10. The TX node receives a MAP with slots for retransmission of the lost frames/packets and with an indication of which frames/packets were received correctly by the RX node.
11. The TX node clears frames/packets received correctly and retransmits lost frames/packet.
12. The RX node may re-send RTR for a specific frame/packet until a limit on the number of retransmissions is reached.
13. If the limit is reached, the frame/packet may still not have been received.

Methods 6 or 8 may be usable for high bit rate stream such as HD video.

Method 7 may be usable for low bit rate stream such as voice in which the RX node is only a listener. This method may reduce bandwidth when the RR is allocated infrequently or not at all for the TX or RX nodes. The RR is not allocated to the TX node when the stream is sent in an unsolicited manner.

Method 8 may save bandwidth for RP by merging the RP in the RR slots. To the extent that the RX node receives streams in RP, the saved time increases.

Figure 10:
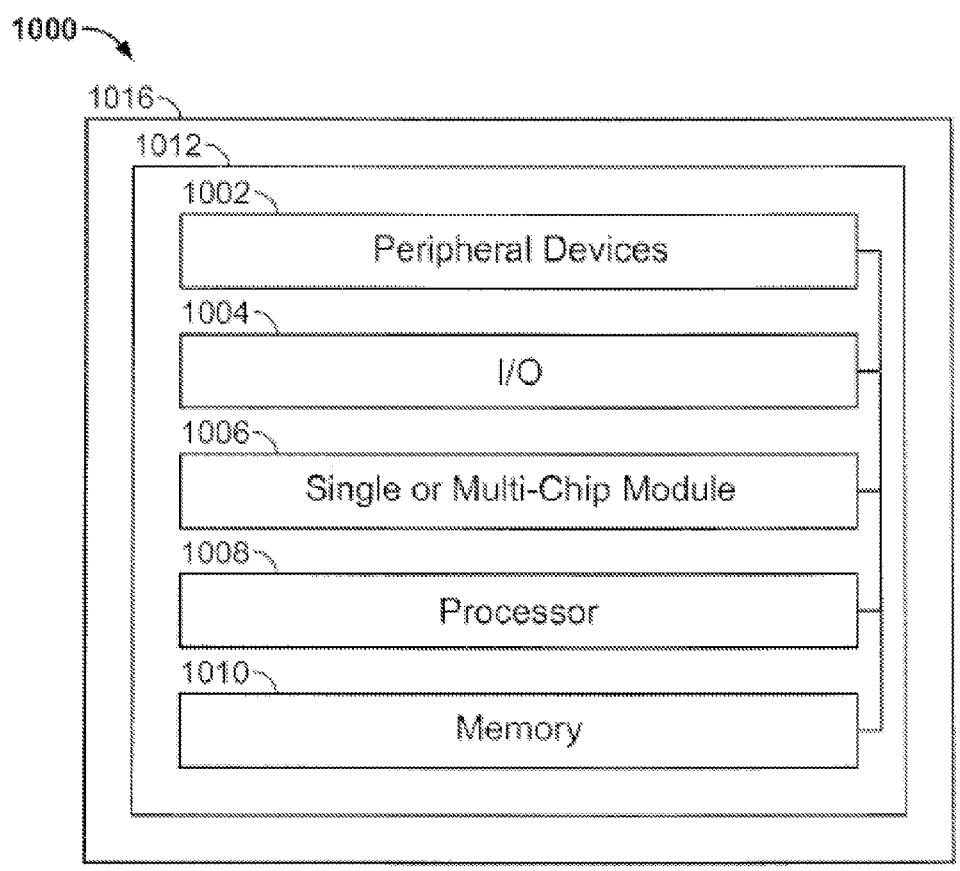
FIG. 10 shows schematically an illustrative device that may be used in accordance with the principles of the invention.

FIG. 10 shows a single or multi-chip module 1006 according to the invention, which can be one or more integrated circuits, in an illustrative data processing system 1000 according to the invention. Data processing system 1000 may include one or more of the following components: I/O circuitry 1004, peripheral devices 1002, processor 1008 and memory 1010. These components may be coupled together by a system bus or other interconnections and are disposed on a circuit board 1012 in an end-user system 1016 that may be in communication with a coax medium transmitting packets in accordance with the systems and methods discussed above.

Figure 11:
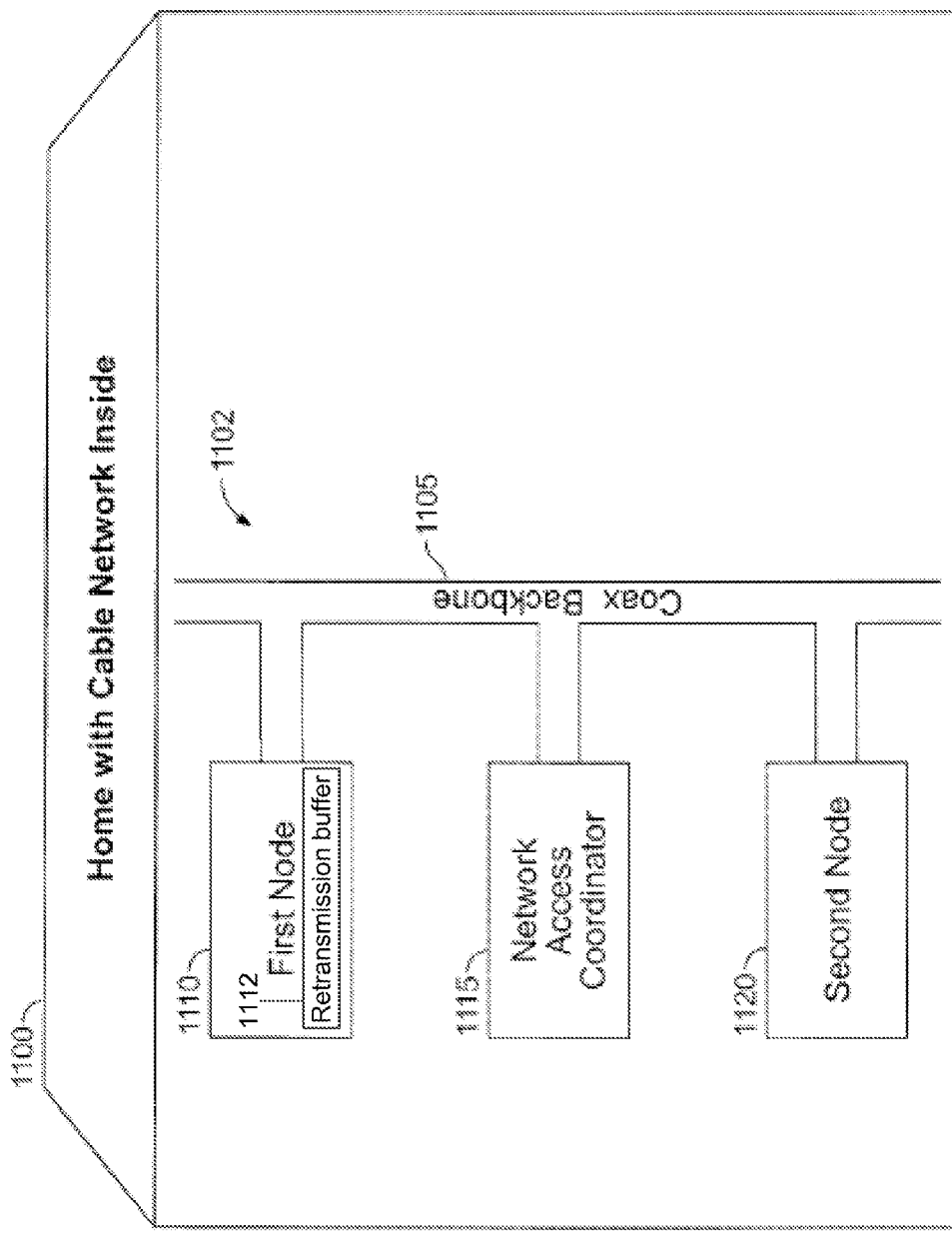
FIG. 11 shows a schematic diagram of a home network for use with systems and methods according to the invention.

FIG. 11 is a simplified block diagram illustration of a home network system 1102 that uses a coax backbone 1105. The home network system 1102 of FIG. 11 is operative for transmitting packets over coax backbone 1105 within a home 1100. The home network system 1102 includes first node 1110 that includes a retransmission buffer 1112, second node 1120 and network access coordinator 1115. First node 1110, second node 1120 and network access coordinator 1115 are configured to communicate over coax backbone 1105.

Certain features of the invention relate to improvements in MoCA technology as set forth in the MoCA 2.0 specification ("MoCA 2.0"). MoCA 2.0 employs powerful forward error correction code that ensures safe transmission with a packet error rate of 1e-6 or less in regular cable environments. However, in some noisy environments (as in Low RF frequency range), ingress noise and/or a random non-stationary noise may occur, and may cause packet losses at a rate that is higher than 1e-6. In such cases, applying a retransmission protocol according to the invention may recover the errors. The MoCA retransmission protocol can be simplified to avoid increasing complexity of receiving buffers.

The following features of the invention illustrate embodiments of systems and methods for implementing a retransmission mechanism in MoCA 2.0 according to the invention. When a packet is received with CRC errors, the transmitter node is notified of the transmission failure by a NACK message sent by the receiver node. The transmitter then retransmits the failed packet and all the subsequent transmitted packets, thus avoiding the need to buffer and reorder packets at the receiver. The additional overhead involved is negligible as retransmission occurrence rate is low.

The transmitter buffers the transmitted but not yet acknowledged packets. If the transmitter buffer is exhausted, the transmitter may replace the oldest unacknowledged packets with new transmitted packets.

Retransmission support by a node can be indicated in a field of a table such as a NODE_SUPPORT_FIELD. Application of retransmission can be determined by the receiver, but preferably only if the source node—i.e., the transmitter node—and the Network Controller indicate in their respective NODE_PROTOCOL_SUPPORT fields that retransmission is supported.

Preferred embodiments of retransmission are configured to be applied to Data MAC Service Data Units ("MSDUs"). In systems that include packet aggregation, one or more MSDUs may form a portion of a MAC Protocol Data Unit ("MPDU").

Figure 12:
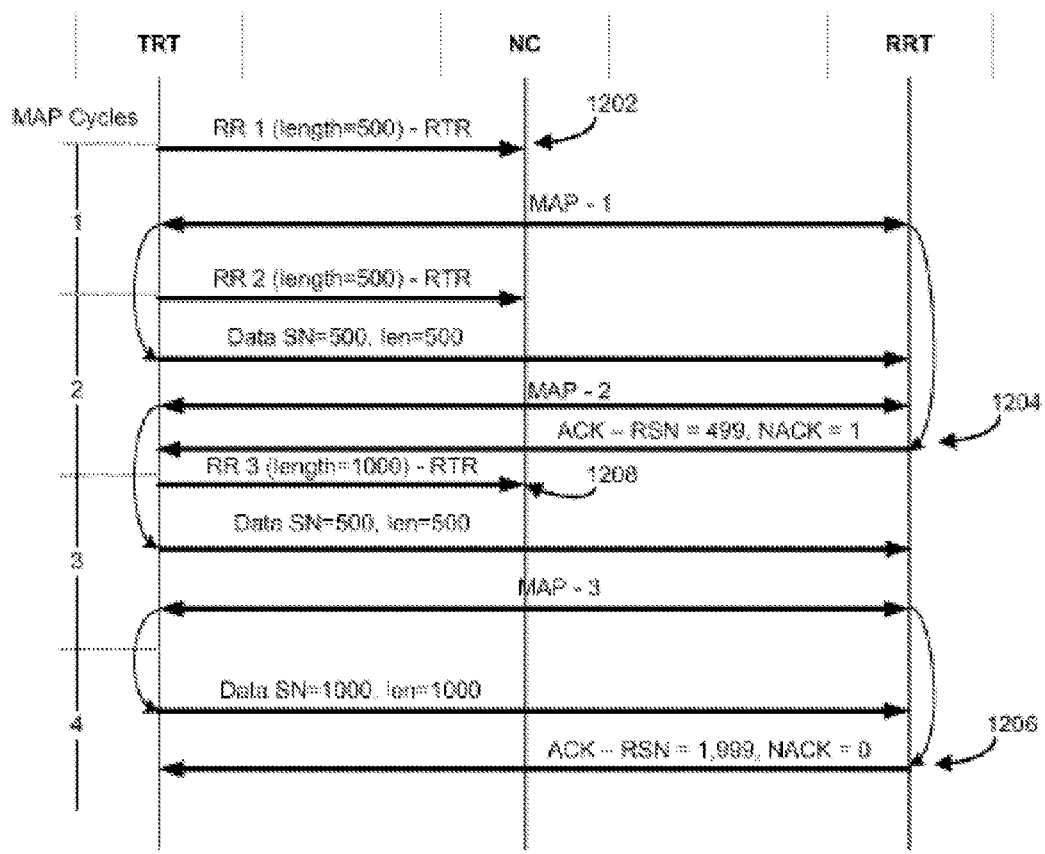
FIG. 12 shows one embodiment of retransmission protocol in MoCA 2.0 according to the invention.
Figure 13:
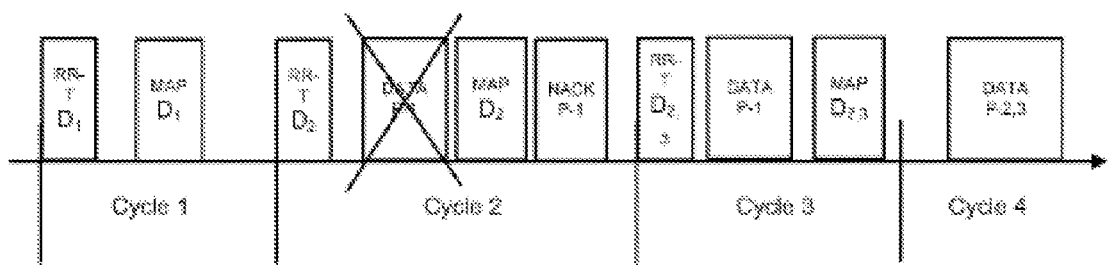
FIG. 13 shows schematically one embodiment of retransmission in MoCA 2.0 according to the invention.

One exemplary embodiment of retransmission protocol in MoCA 2.0 according to the invention is shown in FIG. 12 and an exemplary schematic diagram of retransmission is shown in FIG. 13.

MoCA 2.0 Retransmission Protocol

Retransmission protocol is applied per MoCA Flow. For the purposes of this application, a "MoCA flow" is defined as a uni-directional traffic stream sourced at one MoCA node and destined to one or more other MoCA nodes. A MoCA flow may be determined by: a source mode ID, destination node ID and priority of its data.

Application of retransmission can be initiated by the transmitter node of the Flow. Retransmission can preferably only be applied if the Egress node and the NC indicate that retransmission is supported in their NODE_PROTOCOL_SUPPORT field.

If the destination node ID of a MoCA Flow is a Broadcast ID and the MoCA Flow is not a PQoS Flow, the Ingress node should preferably not apply retransmission. It should be noted that any use of the term "should" herein may be understood to describe a single embodiment of the invention, but also indicate the possibility of the existence of alternative embodiments of the invention.

If the destination node ID of a MoCA Flow indicates a Broadcast ID—i.e., a flow to preferably all the live nodes on the network—and the MoCA Flow is a PQoS flow the Ingress node may require one (or more) of the egress nodes to acknowledge the transmissions.

Each MSDU may be classified to a specific MoCA flow.

Each MoCA flow preferably includes a Sequence Number ("SN"). The SN may be assigned to each MSDU. The SN may be incremented per ingress MSDU by the number of data bytes carried in the MSDU.

In some embodiments of the invention, three entities may be involved in the retransmission procedure:

The Flow ingress node (alternately described herein as the transmitter node, transmitter, or TRT)

The Flow egress node (alternately described herein as the receiver node, receiver, or RRT)

The Network Controller (alternately described herein as the ("NC"))

A transmitter requesting a transmission opportunity for a retransmission may, in some embodiments, set the retransmission bit in a corresponding Request Element.

A transmitter sending an MPDU that requires retransmission service may preferably indicate the following information in each MSDU header:

1. Retransmission service is applied
2. The sequence number (SN)
3. The lowest sequence number that still exists in its retransmission buffer, referred to herein as the Start Sequence Number ("SSN").

FIG. 12, at 1202, shows a MoCA flow identified as RR 1. RR 1 requests transmission of a packet having a length of 500 and indicates the possibility of retransmission service.

Upon successful reception of MSDUs, the receiver forwards all MSDUs to the Ethernet Convergence Layer ("ECL"). After each successful receipt of an MSDU, the receiver should preferably increment the Received Sequence Number ("RSN") by the number of data bytes stored in the correctly-received MSDU.

The RSN then may indicate the last MSDU that was received correctly by the receiver. The RSN value should preferably always be equal or higher than the SSN value indicated in the received MSDU header. The receiver should preferably monitor the SSN value and should preferably reset its RSN value to be equal to the SSN value if it is lower than the SSN.

The receiver continues to forward the MSDUs until the receiver encounters an MSDU that was not received correctly—e.g., an MSDU with CRC errors or an MSDU granted by the MAP message that was not received at all.

The receiver may send an ACK message to the transmitter upon receiving an MPDU. Step 1204 shows that, when an MSDU was not received correctly, the receiver should preferably send a control frame directly to the transmitter (or, alternatively, to the control frame via the NC), indicating a loss of packet and the last correctly-received sequence number. In the exemplary case in FIG. 12, the last correctly received data had a sequence number of 499. Also, the receiver sets a NACK flag that indicates that a packet after the RSN was lost.

A NACK flag that was set due to a loss of a packet should preferably be cleared by the receiver in at least one of the following two cases, or in any other suitable circumstance:

1. When the lost packet has been retransmitted and received correctly.
2. When the RSN has been reset (due to the SSN being incremented).

If all MSDUs in the MPDU were received correctly and the NACK flag equals zero, the receiver should preferably send an ACK message indicating the last RSN and the NACK flag value. This is shown at step 1206, following the corrected receipt of all the MSDUs. The RSN is shown as 1,999, corresponding to the successful receipt of the 1,000 bytes in cycle 4.

A MoCA 2.0 NC may preferably allocate time slots for an ACK frame for the receiver to transmit its ACK messages to the transmitter.

The ACK frame can be sent either as a separate MoCA 2.0 frame directly from the receiver to the transmitter, or as an Information Element ("IE") in a reservation request, via the NC, on the next reservation request frame—preferably whichever comes first. If an ACK is received by the NC as an IE, the NC should preferably relay the ACK message to the transmitter node as an IE in the next MAP frame.

Step 1208 shows that the transmitter, upon receiving a NACK message, should preferably—

1. Remove from its retransmission buffer all MSDUs with an SN equal or lower than the received RSN value;
2. Increment the SSN to be equal to the RSN;
3. Retransmit all MSDUs (such as the retransmission of MSDUs having an SN higher than the RSN, when the NACK flag is set to one (as shown at step 1204);
4. In certain embodiments, the transmitter may preferably remove all MSDUs whose number of retransmission exceeded the maximum allowed retransmission number $N_{rt}$ (the number of retransmission retries); and
5. Check if the SN of the new transmitted packet is larger than the SSN by a preferably pre-determined threshold, such as set forth in a field entitled Max_Win_Size. If so, the transmitter should preferably increment the SSN value accordingly and remove from the transmission buffer all packets having SN values lower than the new SSN value.

NC Operation

ACK Slot Allocation

The NC MAY allocate a dedicated time slot for transmitting the ACK message directly to the TRT. The duration for the ACK slot may be calculated by the NC according to the profile bit-loading and the ACK message size. If the NC schedules an ACK frame it should preferably insure at least a predetermined tack time between the end of the data allocation and the corresponding ACK frame allocation.

Protocol Message Relay

Upon receiving an Acknowledge IE, the NC should preferably relay the Acknowledge IE frame in its next MAP as an NC IE with the same, or other suitable, format as depicted in Table 3 below.

Transmitter Operation

Data Retransmission

The transmitter should preferably set the retransmission Indicator field in each MSDU of the retransmission flow. All MSDUs in an MPDU should preferably be of the same MoCA Flow.

Retransmission with PQoS Flows

When retransmission is applied on PQoS flows, the transmitter preferably does not need to allocate bandwidth for the retransmitted packets.

Retransmission Buffer in the Transmitter

When retransmission or flow control is enabled for a flow, the transmitter should preferably have a buffer for buffering transmitted but not acknowledged MSDUs and MSDUs that are not transmitted for the flow.

Retransmission Frames Format

A receiving node that supports the retransmission protocol should transmit an ACK message either as an ACK frame or as an IE in its RR frame, or in some other suitable fashion. One embodiment of ACK IE format (which is transmitted to the NC, and then relayed to the transmitter) is depicted in Table 3 below. One embodiment of an ACK frame format is depicted in Table 4. One embodiment of retransmission timing is set forth below in Table 6.

TABLE 3

| Field | Length | Explanation |
|---|---|---|
| FRAME_SUBTYPE | 4 bits | 0x1ACK element |
| FRAME_TYPE | 4 bits | 0x7 |
| LENGTH | 6 bits | 4 |
| RESERVED | 2 bits | Type III |
| Protocol IE Payload | | |
| TRANSMITTER NODE ID | 8 bits | Transmitter node ID |
| RESERVED | 8 bits | Type III |
| RSN | 32 bits | The Receive Sequence Number: the sequence number of the last MSDU that has been received correctly |
| NACK | 1 bit | set to one to indicate packet loss |
| RESERVED | 31 bits | Type III |

TABLE 4

| Field | Length | Usage |
|---|---|---|
| MPDU Header | | |
| TRANSMIT_CLOCK | 32 bits | |
| PACKET_SUBTYPE | 4 bits | Ack (0x0) |
| PACKET_TYPE | 4 bits | Data Link (0xb) |
| VERSION | 8 bits | 0x20 |
| RESERVED | 8 bits | 0x00; Type III |
| SOURCE_NODE_ID | 8 bits | Source node ID |
| RESERVED | 8 bits | 0x00; Type III |
| DESTINATION_NODE_ID | 8 bits | Destination node ID |
| MPDU LENGTH | 16 bits | |
| RESERVED | 32 bits | Type III |
| MPDU HEADER CS | 16 bits | |
| ACK Frame Payload | | |
| TRANSMITTER NODE ID | 8 bits | Transmitter node ID |
| RESERVED | 8 bits | Type III |
| RSN | 32 bits | The Receive Sequence Number: the sequence number of the last MSDU that has been received correctly |
| NACK | 1 bit | set to one to indicate packet loss |
| RESERVED | 31 bits | Type III |
| MSDU CS | 32 bits | |

The following shows one embodiment of an MSDU-Header Format (the MSDU which is used for data transmission) according to the invention:

TABLE 5

| Parameter Name | Length | Description |
|---|---|---|
| SSN | 16 bits | Starting Sequence Number at the retransmission buffer (Not valid if Retransmission is not applied). |
| SN | 16 bits | The Sequence Number of the first MSDU (Not valid if Retransmission is not applied). |
| NMSDU | 8 bits | The number of MSDU include in this MPDU. |
| Reserved | 8 bits | |
| For (i=0; i<NPDU; i++){ MSDU_LEN} | 16 bits | Size in bytes of a MSDU data including the MSDU-CS |
| MSDU HEADER CS | 16 bits | CS of the entire MSDU header. (assuming this field is 0) |

TABLE 6

| Parameter | Value | Explanation |
|---|---|---|
| $N_{RT}$ | 1 | the number of retransmission retries |
| $T_{ACK}$ | 150 us | the time interval between the end of the packet sent with retransmission protocol to the start of the ACK slot that the receive node indicates the receive result in the ACK message |

FIG. 13 shows that in a first cycle, a request to transmit Data $D_1$ is transmitted prior to the first Map Cycle $D_1$. In cycle 2, a request to transmit Data $D_2$ is shown together with the failure to successfully receive Data P-1. Also shown in cycle 2 are Map Cycle $D_2$ as well as NACK P-1 indication, which preferably is transmitted from the receiver directly to the transmitter.

A third cycle, cycle 3, includes a request to transmit Data $D_{2,\ 3}$, a retransmission of Data P-1 (because the previous request, RR-T $D_2$ had only requested enough bandwidth for a single transmission, and had not been aware, at the time of request RR-T $D_2$ that a retransmission request was necessary), and Map Cycle $D_{2,\ 3}$ (which requested enough bandwidth for the transmission of the new packet as well as for the retransmitted packet). Finally, cycle 4 shows successful transmission and reception of Data P-2, 3.

It will be appreciated that for clarity the description throughout the specification, including specific examples of parameter values provided herein, is sometimes specific to certain protocols such as the MoCA and/or Ethernet protocols. However, this is not intended to be limiting and the invention may be suitably generalized to other cable protocols and/or other packet protocols. For example, use of terms, such as MAP, Allocation Unit ("AU"), Reservation Request ("RR") etc. which may be specific to a particular protocol such as MoCA or Ethernet, to describe a particular feature or embodiment is not intended to limit the scope of that feature or embodiment to that protocol specifically; instead the terms are used generally and are each intended to include parallel and similar terms defined under other protocols.

It will be appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

What is claimed is:

1. A system for transmitting packets over a network of communication channels, the system comprising:
   first and second nodes in communication with a coax backbone, said first node comprising a retransmission buffer; and
   a network access coordinator operative to coordinate access of the first and second nodes to the coax backbone, wherein access time to the coax backbone is divided into cycles that are managed by the network access coordinator where access rules for a current cycle are described in a message transmitted by the network access coordinator to the first and second nodes during a previous cycle;
   wherein, in the current cycle at least one packet is transmitted by the first node to the second node, the at least one packet being stored by the first node in the retransmission buffer and, the at least one packet comprising:
   an indication that retransmission service is applied; and
   a length corresponding to the at least one packet; and
   if, during the current cycle the at least one packet is not received by the second node:
      the second node is operative to send a frame indicating a loss of the at least one packet to the network access coordinator during a subsequent cycle; and
      the first node is operative to retrieve the at least one packet from the retransmission buffer and transmit the at least one packet no earlier than two subsequent cycles.

2. The system of claim 1, wherein the network access coordinator is operative to:
   receive the frame; and
   transmit the frame to the first node.

3. The system of claim 1 wherein, following a successful reception of the at least one packet the second node is operative to increment a received sequence number by a number of data bytes in the at least one packet.

4. The system of claim 1 wherein, if, during the current cycle the at least one packet is not received by the second node, the second node is further operative to send the frame to the network access coordinator indicating a sequence number of a last correctly-received packet.

5. The system of claim 1 wherein, the at least one packet indicates a lowest sequence number that exists in the retransmission buffer of the first node.

6. The system of claim 5 wherein, if the lowest sequence number that exists in the retransmission buffer is higher than a sequence number of a last correctly-received packet, then the second node is operative to reset the sequence number of the last correctly-received packet to equal the lowest sequence number that exists in the retransmission buffer.

7. A method for transmitting packets over a network of communication channels, the method comprising:
   using a network access coordinator to coordinate access of first and second nodes over a coax backbone, the first node comprising a retransmission buffer, wherein access time to the coax backbone is divided into cycles;
   transmitting at least one packet by the first node to the second node during a current cycle and storing by the first node the at least one packet in the retransmission buffer, the at least one packet comprising:
   an indication that retransmission service is applied; and
   a length corresponding to the at least one packet; and
   if, during a predetermined time period following transmission of the at least one packet, the at least one packet is not received by the second node:
      sending a frame indicating a loss of the at least one packet from the second node to the network access coordinator during a subsequent cycle; and
      retrieving the at least one packet from the retransmission buffer by the first node and transmitting the at least one packet from the first node no earlier than two subsequent cycles.

8. The method of claim 7, further comprising using the network access coordinator to receive the frame and transmit the frame to the first node.

9. The method of claim 7 further comprising, following a successful reception of the packet, incrementing a received sequence number stored at the second node by a number of data bytes stored in the packet.

10. The method of claim 7 wherein the frame further indicates a sequence number of a last correctly-received packet.

11. The method of claim 7 monitoring a lowest sequence number that exists in the retransmission buffer.

12. The method of claim 11 wherein, if the lowest sequence number that exists in the retransmission buffer is higher than a sequence number of a last correctly-received packet, then resetting the sequence number of the last correctly-received packet to equal the lowest sequence number that exists in the retransmission buffer.

13. The method of claim 7 further comprising transmitting from the second node to the network access coordinator an indication of the length of the packet to be transmitted.

14. A method for transmitting packets over a network of communication channels, the method comprising:
   transmitting at least one packet from a first node during a current access cycle, the first node comprising a retransmission buffer, and the at least one packet indicating that retransmission service is applied for the at least one packet;
   storing the at least one packet in the retransmission buffer;
   if, during a predetermined time period following transmission of the at least one packet, the at least one packet is not received by a second node, using the first node to receive, during a subsequent access cycle, a frame from the second node that indicates a loss of the at least one packet, said frame being transmitted via network access coordinator; and
   retrieving the at least one packet by the first node from the retransmission buffer and transmitting the at least one the packet by the first node no earlier than two subsequent access cycles.

15. The method of claim 14, wherein the at least one packet further indicates a length corresponding to the at least one packet.

16. The method of claim 14, further comprising, following a successful reception of the at least one packet, incrementing a received sequence number stored at the second node by a number of data bytes stored in the packet.

17. The method of claim 14 wherein, if, during the predetermined time period the packet is not received by the second node, sending the frame from the second node to the network access coordinator, the frame indicating a sequence number of a last correctly-received packet.

18. The method of claim 14, wherein the at least one packet further comprises a lowest sequence number that exists in the retransmission buffer located at the first node.

19. The method of claim 14, wherein the frame further indicates a successful reception of another packet, and the method further comprising:
   removing, by the first node, the another packet from the retransmission buffer.

20. A method for transmitting media access control (MAC) service data units (MSDUs), the method comprising:
   storing a plurality of MSDUs in a memory, wherein each of the plurality of MSDUs is associated with a sequence number;
   transmitting, to a node over a network that is managed by a network access coordinator, a media access control (MAC) protocol data unit (MPDU) that comprises the plurality of MSDUs that are stored in the memory, an indication that retransmission is applied for the plurality of MSDUs, and a first sequence number that comprises a first lowest sequence number of the the plurality of MSDUs that are stored in the memory;
   receiving, from the network access coordinator, a message that indicates that a first MSDU of the plurality of MSDUs was received by the node and that a second MSDU of the plurality of MSDUs was not received by the node, wherein the message comprises a second sequence number that is greater than or equal to the first sequence number;
   removing the first MSDU of the plurality of MSDUs from the memory; and
   transmitting the second MSDU of the plurality of MSDUs that is stored in the memory to the node along with a third sequence number that corresponds to the lowest sequence number of the the plurality of MSDUs stored in the memory subsequent to removing the first MSDU of the plurality of MSDUs from the memory.

21. The method of claim 20, wherein access time of the network is divided into cycles that are managed by the network access coordinator.

22. The method of claim 21, wherein the MPDU is transmitted during a first cycle, the message is received during a second cycle that is subsequent to the first cycle, and the second MSDU is transmitted during a third cycle that is subsequent to the second cycle.

23. The method of claim 22, wherein the memory comprises a retransmission buffer that stores the plurality of MSDUs.

24. The method of claim 23, wherein the node is distinct from the network access coordinator.

25. A method for receiving media access control (MAC) Service data units (MSDUs), the method comprising:
   receiving, from a first node over a network that is managed by a network access coordinator, a media access control (MAC) protocol data unit (MPDU) that comprises a plurality of MSDUs each being associated with a sequence number, an indication that retransmission is applied for the plurality of MSDUs, and a first sequence number comprising a lowest sequence number of at least a portion of the plurality of MSDUs that are stored at the first node;
   determining that a first MSDU of the plurality of MSDUs was received correctly and a second MSDU of the plurality of MSDUs was received incorrectly;
   transmitting a message to the network access coordinator, for transmission by the network access coordinator to the first node, that indicates that the first MSDU was received correctly and that the second MSDU was received incorrectly, wherein the message comprises a second sequence number that is greater than or equal to the first sequence number; and
   receiving, from the first node, the second MSDU.

26. The method of claim 25, wherein access time of the network is divided into cycles that are managed by the network access coordinator.

27. The method of claim 26, wherein the MPDU is received during a first cycle, the message is transmitted during a second cycle that is subsequent to the first cycle, and the second MSDU is received during a third cycle that is subsequent to the second cycle.

28. The method of claim 27, wherein the node is distinct from the network access coordinator.

* * * * *